United States Patent
Kobayashi

(10) Patent No.: US 10,782,186 B2
(45) Date of Patent: Sep. 22, 2020

(54) MONOCHROMATOR

(71) Applicant: SHIMADZU CORPORATION, Kyoto (JP)

(72) Inventor: Tomoari Kobayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/676,463

(22) Filed: Nov. 7, 2019

(65) Prior Publication Data
US 2020/0149964 A1    May 14, 2020

(30) Foreign Application Priority Data
Nov. 9, 2018  (JP) ................. 2018-211532

(51) Int. Cl.
*G01J 3/28*  (2006.01)
*G01J 3/18*  (2006.01)
*G02B 5/18*  (2006.01)

(52) U.S. Cl.
CPC ............. *G01J 3/18* (2013.01); *G02B 5/18* (2013.01); *G01J 2003/1885* (2013.01)

(58) Field of Classification Search
CPC .... G01J 3/02; G01J 3/18; G01J 3/2803; G01J 3/2823; G01J 3/28
USPC ...................................................... 356/328
See application file for complete search history.

(56) References Cited

U.S. PATENT DOCUMENTS 5,767,965 A * 6/1998 Zhou .................. G01J 3/06
356/328
2013/0188256 A1* 7/2013 Yokota ................. G01J 3/027
359/615

FOREIGN PATENT DOCUMENTS

JP    2001-343283    12/2001

* cited by examiner

*Primary Examiner* — Md M Rahman
(74) *Attorney, Agent, or Firm* — JCIPRNET

(57) ABSTRACT

A monochromator 100 includes: a diffraction grating 2 placed within a housing 1 so as to receive light from an entrance 11 and disperse the light into a spectrum from which a component of light having a set wavelength is to be extracted through an exit 12; an optical filter 92 to be removably inserted between the grating and the exit to remove light within a specific wavelength band which is out of the set wavelength; a rotary drive 5 for rotating the grating using a stepping motor; a wavelength-movement information setter 73 which sets wavelength-movement information to be used for rotating the grating from an original position to a rotational position corresponding to the set wavelength; and a wavelength-movement controller 71 which controls the rotary drive to initially rotate the grating to the original position and subsequently rotate it to the aforementioned rotational position based on the wavelength-movement information.

6 Claims, 2 Drawing Sheets

MONOCHROMATOR

CROSS REFERENCE TO RELATED APPLICATION

The present application claims priority under 35 U.S.C. § 119 to Japanese Application No. 2018-211532 filed Nov. 9, 2018, and the entire content of which is incorporated herein by reference.

TECHNICAL FIELD

The present invention relates to a monochromator to be included in a spectrophotometer, such as an ultraviolet-visible spectrophotometer or atomic absorption spectrophotometer.

BACKGROUND ART

Spectrophotometers, such as ultraviolet-visible spectrophotometers or atomic absorption spectrophotometers, have been commonly known as a type of device used for qualitative and quantitative analyses of samples. In a spectrophotometer, a sample is irradiated with a predetermined wavelength of light, and the amount of light transmitted through the irradiated sample is measured to determine the absorbance of the light at the predetermined wavelength and perform a qualitative-quantitative analysis of the sample. Such a spectrophotometer normally employs a monochromator to obtain a beam of light having a predetermined wavelength.

A monochromator typically includes a housing having an entrance slit and an exit slit, a diffraction grating (light-dispersing element) contained in the housing, as well as a rotary drive mechanism for changing the angle of the diffraction grating to an incident beam of light from the entrance slit. The incident beam from the entrance slight is delivered onto the diffraction grating, which disperses the beam into component wavelengths. Among the resulting dispersed light, only a component of light travelling in a specific direction is eventually extracted from the exit slit. By adjusting the rotational position (angle) of the diffraction grating at an appropriate position, a desired wavelength of light can be extracted. Continuously changing the angle of the diffraction grating yields an optical spectrum for the incident light.

The component of light travelling in the specific direction among the beam of light dispersed into component wavelengths by the diffraction grating contains not only the first-order diffracted light but also other components of light resulting from high-order diffraction. In the spectrophotometer, the high-order diffracted light is cut off from the light extracted from the exit slit of the monochromator so that the quantitative-qualitative analysis of the sample can be correctly and accurately performed. Additionally, a performance check (validation) is regularly conducted to check the correctness of the wavelength, correctness of the amount of detected light, and linearity of the signal intensity. For the cutting-off of the high-order diffracted light as well as the performance check, a specific type of optical filter is used. Such a filter is normally placed between the exit slit of the monochromator and the detector in the spectrophotometer (see Patent Literature 1).

CITATION LIST

Patent Literature

Patent Literature 1: JP 2001-343283 A

SUMMARY OF INVENTION

Technical Problem

Unlike the optical filter for the regularly conducted performance check, the optical filter for cutting off high-order diffracted light (which is hereinafter called the "high-order light cutout filter") is constantly used in the spectrophotometer throughout a qualitative-quantitative analysis of a sample. The kind of optical filter to be used as the high-order light cutout filter should be selected according to the set wavelength. Therefore, in the configuration in which the high-order light cutout filter is placed between the monochromator and the detector, it is necessary to prepare a plurality of kinds of high-order light cutout filters for wavelengths which may possibly be set. This requires an additional installation space for the filters between the monochromator and the detector.

A possible solution to this problem is a monochromator which internally has a plurality of kinds of high-order light cutout filters so that an appropriate kind of optical filter for the set wavelength can be placed between the diffraction grating and the exit slit. However, this configuration may possibly cause the optical axis of the light dispersed into component wavelengths by the diffraction grating to deviate from the correct direction when the light passes through the high-order light cutout filter before travelling toward the exit slit. A monochromator used in a spectrophotometer normally employs an extremely narrow exit slit to ensure a high level of wavelength resolution. Therefore, even an extremely small amount of deviation of the optical axis of the light which has passed through the high-order light cutout filter causes the wavelength of the light exiting from the exit slit to deviate from the set wavelength.

The description so far has been concerned with the case where the optical filter for cutting off high-order diffracted light is placed between the diffraction grating and the exit slit. The same problem also occurs with any kind of optical filter which is placed between the diffraction grating and the exit slit for cutting off light within a specific wavelength band which is out of the set wavelength, such as an optical filter for cutting off stray light.

Thus, in a monochromator including an optical filter configured to be removably inserted into an optical path between a diffraction grating and an exit so as to remove light within a specific wavelength band which is out of the set wavelength, the problem to be solved by the present invention is to eliminate the difference which occurs between the set wavelength of the monochromator and the wavelength of the light extracted from the exit when the optical filter is present in the optical path.

Solution to Problem

A monochromator according to the present invention developed for solving the previously described problem includes:
 a housing with an entrance and an exit;
 a diffraction grating placed within the housing so as to receive incident light from the entrance and disperse the incident light into a spectrum of light from which a component of light having a set wavelength is to be extracted through the exit;

an optical filter configured to be removably inserted into an optical path extending from the diffraction grating to the exit, and remove light within a specific wavelength band which is out of the set wavelength;

a rotary drive mechanism configured to rotate the diffraction grating, using a stepping motor as a drive source;

a wavelength-movement information setter configured to set wavelength-movement information which is a kind of information to be used for rotating the diffraction grating from a predetermined original position to a rotational position corresponding to the set wavelength; and a wavelength-movement controller configured to control the rotary drive mechanism so as to perform a wavelength-movement operation which includes rotating the diffraction grating to the original position and subsequently rotating the diffraction grating to the aforementioned rotational position based on the wavelength-movement information.

The "light within a wavelength band which is out of the set wavelength" in the present invention includes components of light which travel in different directions from the component of light having the set wavelength among the components of light dispersed into wavelengths by the diffraction grating, high-order diffracted light which travels in the same direction as the component of light having the set wavelength, as well as stray light which results from incident light entering the housing from the entrance and undergoing unintended reflection at some portions within the monochromator. Examples of the optical filter for removing such unwanted light include: a bandpass filter which allows light to pass through only within a specific wavelength band; a high-pass filter which cuts off high-order diffracted light; and an order-separating filter which allows only the first-order diffracted light to pass through, while cutting off high-order diffracted light whose wavelength is shorter than that of the first-order diffracted light. The optical filter should be an appropriate kind of optical filter for the set wavelength. Accordingly, it is preferable for the monochromator according to the present invention to include a plurality of kinds of optical filters and a filter insertion mechanism configured to be capable of selectively inserting one of the optical filters into the optical path extending from the diffraction grating to the exit.

Stepping motors are widely used as the drive source in a rotary drive mechanism for rotating a diffraction grating in a monochromator, since they are comparatively small in size and easy to control by a computer. If there were a difference between the wavelength of the light extracted from the monochromator and the previously set wavelength, it would be impossible to correctly perform a qualitative-quantitative analysis of a sample in the spectrophotometer. To avoid such a situation, the stepping motor in a monochromator is controlled as follows so as to correctly rotate the diffraction grating to the rotational position which corresponds to the set wavelength.

Two original points are defined: an original point which serves as the reference point for the motion of the stepping motor (this point is hereinafter called the "machine origin"), and an original point which serves as the reference point for the rotational position of the diffraction grating (this point is hereinafter called the "wavelength origin"). When the set wavelength has been changed, the diffraction grating is temporarily returned to the machine origin and subsequently rotated to the wavelength origin. From this position, the diffraction grating is further rotated to the rotational position corresponding to the set wavelength. The fact that the diffraction grating has reached the machine origin is detected with an origin sensor, such as an optoelectronic sensor or microswitch. After the diffraction grating has reached the machine origin, the number of drive pulses which corresponds to the rotation angle from the machine origin to the wavelength origin are given to the stepping motor. As will be described later, this number of drive pulses is previously measured and known.

The machine origin and wavelength origin vary from one individual monochromator to another. Accordingly, the number of drive pulses of the stepping motor corresponding to the rotation angle of the diffraction grating from the machine origin to the wavelength origin should be determined for each individual monochromator before the shipment of the product from the factory. A study by the present inventor has revealed that the wavelength of the light exiting from the exit may be different from the set wavelength when an optical filter is placed in the optical path extending from the diffraction grating to the exit in the monochromator, even if no such difference is present when the optical filter is not placed. A likely reason for this difference is as follows: When the light from the diffraction grating passes through the optical filter (to be exact, when the light from the diffraction grating enters the optical filter as well as when the light leaves the same filter), the light undergoes refraction. This causes deviation of the optical axis of the light which should be directed to the exit, and consequently changes the relationship between the wavelength of the light exiting from the exit and the rotational position of the diffraction grating. The difference between the wavelength of the light exiting from the exit and the set wavelength due to the insertion of the optical filter occurs if there is a discrepancy between the actual installation angle of the optical filter and the designed installation angle. This discrepancy can be reduced or eliminated by correcting the number of drive pulses to be given to the stepping motor from the machine origin to the wavelength origin and/or the number of drive pulses to be given to the stepping motor from the wavelength origin to the rotational position corresponding to the set wavelength. The present invention has been realized from such an idea.

A feature of the present invention exists in that the wavelength-movement information setter is provided to allow for the setting of the wavelength-movement information, which is a kind of information to be used for rotating the diffraction grating from a predetermined original position to a rotational position corresponding to the set wavelength. By this system, the diffraction grating can be rotated to an appropriate rotational position corresponding to the set wavelength when an optical filter is present between the diffraction grating and the exit as well as when no such filter is present. The "predetermined" origin may be either of the two aforementioned origins, i.e. the machine origin and the wavelength origin. Examples of the wavelength-movement information include: the rotation angle from the machine origin to the wavelength origin and/or the rotation angle from the wavelength origin to the rotational position corresponding to the set wavelength; the number of drive pulses required for the stepping motor to rotate the diffraction grating by the aforementioned rotation angle; and a computational expression for calculating the aforementioned rotation angle or number of drive pulses. It is also possible to prepare the wavelength-movement information in such a manner that the rotation angle, number of pulses or computational expression mentioned earlier is set as the wavelength-movement information to be used when no optical filter is present between the diffraction grating and the exit, while a correction coefficient for correcting the rotation angle, number of pulses or computational expression to be used when no optical filter is present is set as the wavelength-movement information to be used when an optical filter is present.

The wavelength-movement information may be manually set by a user of the monochromator by using a keyboard, numeric keypad or similar input device, or the monochromator may be provided with a storage section in which the wavelength-movement information is to be previously stored, in which case the wavelength-movement information setter can be configured to read the wavelength-movement information from the storage section and set the wavelength-movement information when the wavelength-movement operation is performed by the wavelength-movement controller.

In the configuration in which the user manually sets the wavelength-movement information, it is preferable to allow the user to easily access the wavelength-movement information to be used when an optical filter is present in the optical path extending from the diffraction grating to the exit, as well as the wavelength-movement information to be used when no such optical filter is present. This can be achieved, for example, by printing those pieces of wavelength-movement information on a serial-number nameplate fixed to each individual monochromator or describing them in an operation manual prepared for the monochromator.

In the configuration in which the wavelength-movement information is previously stored in the storage section, it is preferable for the monochromator to further include a filter detector configured to detect the presence of the optical filter in the optical path extending from the diffraction grating to the exit, where:

the storage section holds both the wavelength-movement information to be used when an optical filter is present in the optical path and the wavelength-movement information to be used when no such optical filter is present; and the wavelength-movement information setter is further configured to read wavelength-movement information from the storage section according to a detection result obtained with the filter detector, and set the wavelength-movement information.

In the configuration in which the monochromator includes the plurality of kinds of optical filters and the filter insertion mechanism configured to selectively insert one of the optical filters into the optical path extending from the diffraction grating to the exit, it is preferable for the monochromator to further include:

a filter detector configured to detect the presence of one of the optical filters in the optical path from the diffraction grating to the exit, and identify the kind of optical filter in the optical path; and a storage section which holds, for each of the plurality of kinds of optical filters, both the wavelength-movement information to be used when the optical filter is present in the optical path and the wavelength-movement information to be used when none of the optical filters is present; where:

the wavelength-movement information setter is configured to read wavelength-movement information from the storage section according to a detection result obtained with the filter detector, and set the wavelength-movement information.

The previously described configuration enables the monochromator to automatically perform the operation of rotating the diffraction grating to an appropriate rotational position for the set wavelength for each of the situations in which an optical filter is present in the optical path extending from the diffraction grating to the exit in the monochromator or no such optical filter is present.

Advantageous Effects of Invention

In a monochromator including an optical filter configured to be removably inserted into an optical path between a diffraction grating and an exit so as to remove light within a specific wavelength band which is out of the set wavelength, the present invention reduces the difference between the set wavelength of the monochromator and the wavelength of the light extracted from the exit when the optical filter is present in the optical path.

DESCRIPTION OF EMBODIMENTS

One embodiment of the monochromator according to the present invention is hereinafter described with reference to the drawings.

Figure 1:
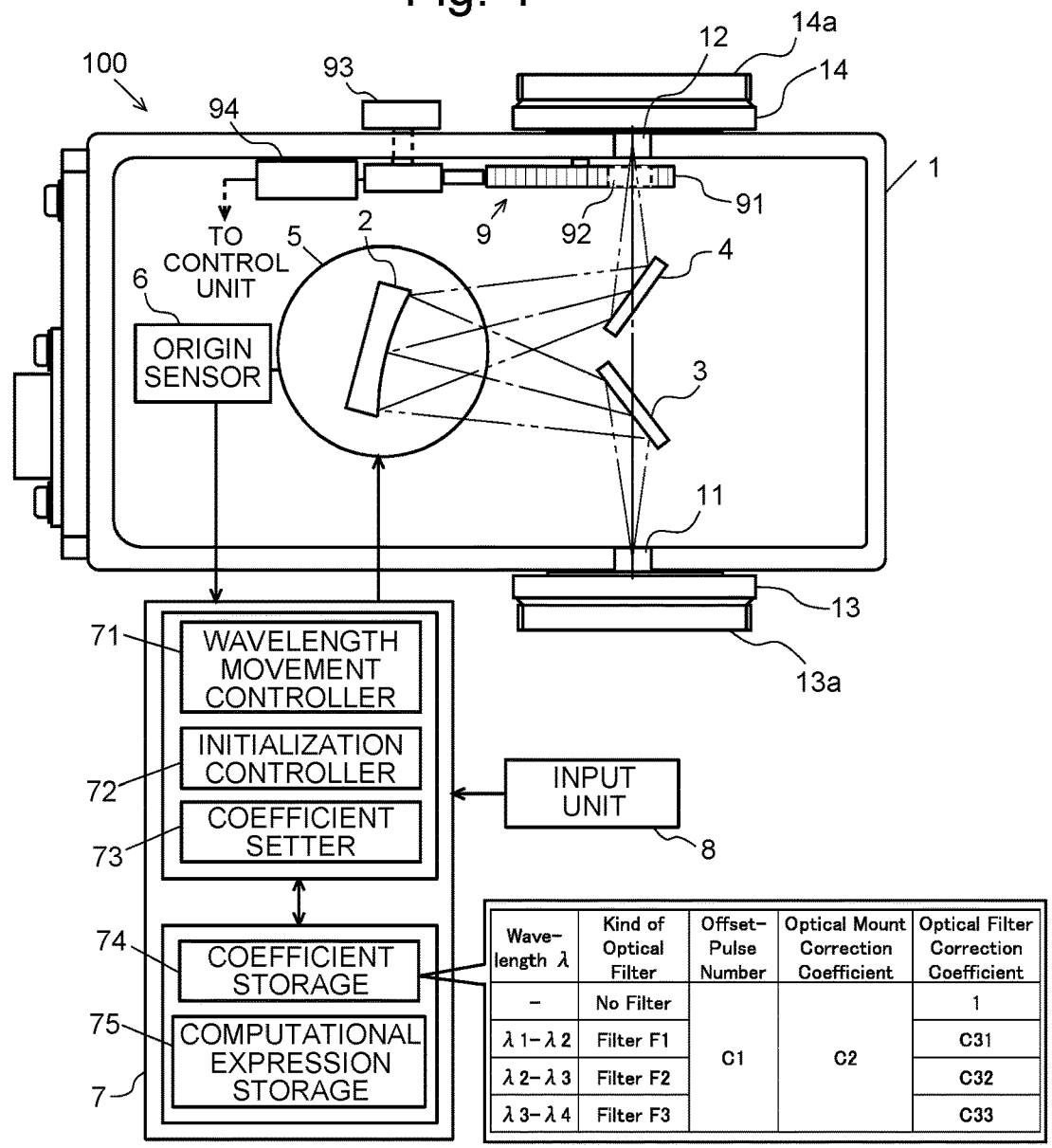
FIG. 1 is a schematic configuration diagram showing one embodiment of the monochromator according to the present invention.

FIG. 1 is a schematic configuration diagram of the monochromator 100 according to the present embodiment. The monochromator 100 includes: a housing 1 having an entrance 11 and an exit 12; a diffraction grating 2 placed within the housing 1; a first mirror 3; a second mirror 4; a rotary drive mechanism 5 for rotating the diffraction grating 2; an origin sensor 6 for detecting the presence of the diffraction grating 2 at a rotational position which corresponds to the position of a machine origin; a control unit 7; and an input unit 8.

The rotary drive mechanism 5 includes a stepping motor and a reduction mechanism which transmits the rotation of the output shaft of the stepping motor to the diffraction grating 2 at a predetermined reduction ratio, to drive the same grating at a reduced rotational speed.

The origin sensor 6 includes, for example, a reflection-type optoelectronic switch which cooperates with a projection 61 formed on the diffraction grating 2 (see FIGS. 2A-2C) to detect the presence of the diffraction grating 2 at the machine origin. The detection signal of the origin sensor 6 is sent to the control unit 7.

At the entrance 11 and exit 12 of the housing 1, slit-attachment mounts 13 and 14 are respectively provided. An entrance slit 13a and exit slit 14a can be removably attached to these mounts 13 and 14, respectively.

A filter unit 9 is located near the exit 12 within the housing 1. Although its details are not shown, the filter unit 9 includes a disc 91, a plurality of openings arranged along the circumferential edge of the disc 91, a plurality of optical filters 92 respectively attached to the plurality of openings except for one opening which is left blank (in FIG. 1, only one optical filter is shown), a rotary dial 93 for rotating the disc 91, and a rotational position sensor 94 for detecting the rotational position of the rotary dial 93. The optical filters 92 are order-separating filters which allow the first-order diffracted light from the diffraction grating 2 to pass through, while cutting off high-order diffracted light whose wavelength is shorter than that of the first-order diffracted light. A plurality of order-separating filters which differ from each other in transmission wavelength band are selected as the optical filters 92. The detection signal of the rotational position sensor 94 is sent to the control unit 7. The rotary dial 93 is located on the outside of the housing 1. Users can manually operate this rotary dial 93 to rotate the disc 91 and thereby switch the device between the state in which one of the optical filters 92 is placed in the optical path from the diffraction grating 2 to the exit 12 and the state in which the blank opening is placed in the optical path.

The control unit 7 is configured to control the operation of the rotary drive mechanism 5. This unit includes a wavelength-movement controller 71, initialization controller 72, coefficient setter 73, coefficient storage section 74, computational expression storage section 75, and other sections as its functional blocks. The coefficient storage section 74 holds an offset pulse number C1 to be used in the initialization process by the initialization controller 72, as well as an optical mount correction coefficient C2 and an optical filter correction coefficient C3 to be used in the wavelength-movement operation by the wavelength-movement controller 71. The computational expression storage section 75 holds computational expressions for computing the number of drive pulses required for the stepping motor to rotate the diffraction grating 2 from the wavelength origin to the rotation angle corresponding to the target wavelength. The computational expression is used for the wavelength-movement operation by the wavelength-movement controller 71. The coefficient storage section 74 and the computational expression storage section 75 correspond to the storage section in the present invention.

The control unit 7 is actually a personal computer, with the functions of the aforementioned functional blocks realized by executing, on this computer, dedicated control software installed on the same computer. Accordingly, the input unit 8 includes a keyboard and a pointing device, such as a mouse.

The offset pulse number C1 is the number of drive pulses required for the stepping motor to drive the diffraction grating 2 from the machine origin to the wavelength origin. The value of the offset pulse number C1 varies from one individual device to another. The wavelength origin is the rotational position at which the diffraction grating 2 is located when the set wavelength is 0 nm.

The optical mount correction coefficient C2 and the optical filter correction coefficient C3 are used in the calculation of the number of pulses required for rotationally driving the diffraction grating from the wavelength origin to the rotational position corresponding to the set wavelength. The values of the optical mount correction coefficient C2 and the optical filter correction coefficient C3 vary from one individual device to another. Furthermore, the optical filter correction coefficient C3 has a different value for each kind of optical filter 92. The number of values of the optical filter correction coefficient C3 stored in the coefficient storage section 74 is the same as the number of kinds of optical filters 92 provided in the disc 91. As shown in FIG. 1, it is hereinafter assumed that the disc 91 are provided with three optical filters 92 (which are hereinafter referred to as optical filters F1, F2 and F3), and three optical filter correction coefficients C31, C32 and C33 which respectively correspond to the optical filters F1, F2 and F3 are stored in the coefficient storage section 74. It is also assumed in the present embodiment that the value of "1" is stored in the coefficient storage section 74 as the optical filter correction coefficient to be used when no optical filter 92 is inserted.

The number of drive pulses required for the stepping motor to drive the diffraction grating from the wavelength origin to the rotational position corresponding to the set wavelength is calculated by the following equation:

$$P=\theta/Res \quad (1)$$

where P is the number of drive pulses, $\theta$ (deg) is the rotation angle of the diffraction grating corresponding to the set wavelength, and Res (deg/pulse) is the angular resolution of the diffraction grating 2.

The rotational angle $\theta$ of the diffraction grating 2 is calculated by the following equation (2):

$$\theta=\arcsin\{K\times(1+C2)\times W1\}/\pi\times 180\}\times C3 \quad (2)$$

where K is an optical mount constant, W1 is the set wavelength, C2 is the optical mount correction coefficient, and C3 is the optical filter correction coefficient. The optical mount constant K is a device-specific value determined by the angle of deviation of the diffraction grating 2, number of serrations per unit length on the grating and other related factors.

The operations to be performed by an operator and related processes for a measurement of a sample in a spectrophotometer including the monochromator 100 according to the present embodiment are hereinafter described.

Figure 2A:
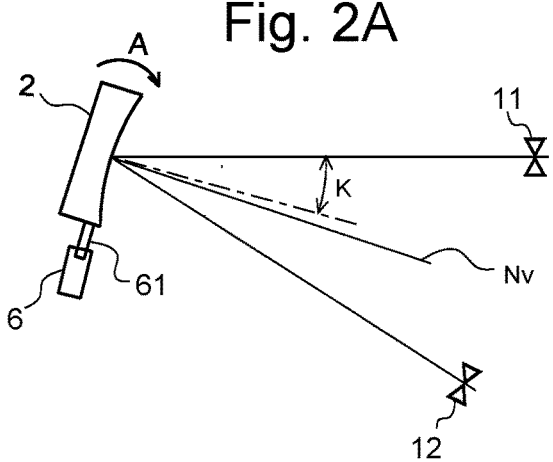
FIG. 2A is a diagram showing a diffraction grating located at a machine origin, with no optical filter between the diffraction grating and the exit.
Figure 2B:
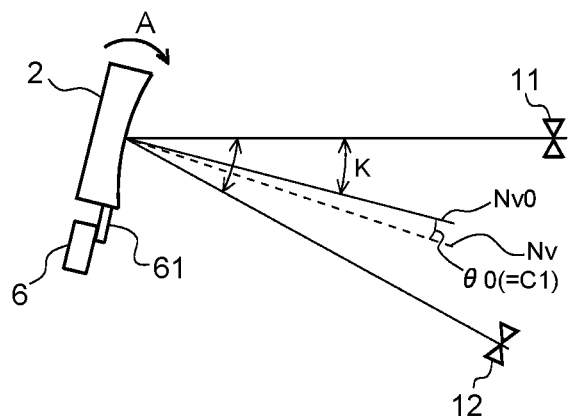
FIG. 2B is a diagram showing a diffraction grating located at a wavelength origin, with no optical filter between the diffraction grating and the exit.
Figure 2C:
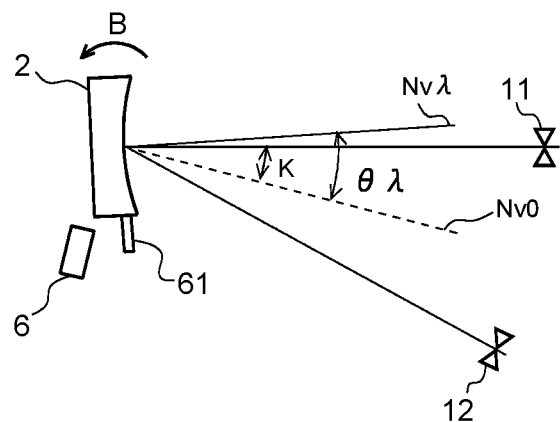
FIG. 2C is a diagram showing a diffraction grating located at a rotational position corresponding to wavelength λ, with no optical filter between the diffraction grating and the exit.

Referring to FIGS. 2A-2C, the following description initially deals with the case in which a measurement of a sample is performed with no optical filter 92 between the diffraction grating 2 and the exit 12. It should be noted that the first and second mirrors 3 and 4 are omitted in FIGS. 2A-2C.

The operator rotates the disc 91 through the rotary dial 93 so that the blank opening in the disc 91 is placed between the exit 12 and the diffraction grating 2. Subsequently, using the input unit 8, the operator enters the target wavelength $\lambda$ and issues a command to initiate the measurement with the spectrophotometer, whereupon the target wavelength $\lambda$ is set as the set wavelength W1. Meanwhile, the rotational position sensor 94 detects the rotational position of the rotary dial 93. Based on this detection signal, the coefficient setter 73 reads the offset pulse number C1, optical mount correction coefficient C2 and optical filter correction coefficient C3 (in the present case, C3 is "1") from the coefficient storage section 74. The coefficient setter 73 sets C1 as the number of drive pulses to be used in the initializing operation by the initialization controller 72, as well as C2 and "1" as the coefficients to be used in the wavelength-movement operation.

Next, the initialization controller 72 sends a series of pulses to the rotary drive mechanism 5 to drive the stepping motor and rotate the diffraction grating 2 in the direction of arrow A (see FIG. 2A). As soon as it is detected by the origin sensor 6 that the rotational position of the diffraction grating 2 has reached the machine origin, the initialization controller 72 stops sending the series of pulses (as shown in FIG. 2A). Subsequently, the same controller 72 sends C1 drive pulses to the rotary drive mechanism 5, which drives the stepping motor so that the diffraction grating 2 rotates in the direction of arrow B (which is opposite to the direction of arrow A)

by angle θ0, to be positioned at the wavelength origin (as shown in FIG. 2B). It should be noted that reference sign Nv in FIGS. 2A and 2B denotes a normal to the diffraction grating 2 in the situation in which the diffraction grating 2 is positioned at the machine origin, while reference sign Nv0 denotes the same normal in the situation in which the diffraction grating 2 is positioned at the wavelength origin. The angle formed by normal Nv and normal Nv0 equals θ0, as shown in FIG. 2B.

After the diffraction grating 2 has reached the wavelength origin, the wavelength-movement operation by the wavelength-movement controller 71 is performed. Specifically, the set wavelength W1 and the optical mount correction coefficient C2 are substituted into equation (2) stored in the computational expression storage section 75, to obtain the rotation angle θλ of the diffraction grating 2 corresponding to the set wavelength W1. Substituting this rotation angle θλ into equation (1) yields the number of drive pulses P of the stepping motor. The calculated number of drive pulses P is sent to the rotary drive mechanism 5, which drives the stepping motor so that the diffraction grating 2 rotates in the direction of arrow B by angle θλ, to reach the rotational position corresponding to the set wavelength. Reference sign Nvλ in FIG. 2C denotes a normal to the diffraction grating 2 in the situation in which the diffraction grating 2 is positioned at the rotational position corresponding to the set wavelength. The angle formed by normal Nvλ, and normal Nv0 equals θλ.

In this state, light is emitted from a light source. A portion of the light passes through the entrance slit 13a and the entrance 11 into the housing 1. After being reflected by the first mirror 3, the light hits the diffraction grating 2. The light which has hit the diffraction grating 2 is dispersed by the same grating 2. Among the dispersed light, the component of light having a wavelength corresponding to the rotational position of the diffraction grating 2 (i.e. the set wavelength W1) is reflected by the second mirror 4 and eventually exits from the exit 12 and the exit slit 14a.

In the case where a measurement of a sample is performed with an optical filter 92 in the optical path between the exit 12 and the diffraction grating 2 in the monochromator 100, the operations to be performed by an operator and related processes will be as follows:

The operator initially rotates the disc 91 through the rotary dial 93 so that an appropriate kind of optical filter 92 in the disc 91 is placed between the exit 12 and the diffraction grating 2. Now, suppose that filter F1 has been placed. In this state, the operator using the input unit 8 enters the target wavelength λ and issues a command to initiate the measurement with the spectrophotometer, whereupon the target wavelength λ is set as the set wavelength W1. The target wavelength λ in the present case is included within the transmission wavelength band λ1-λ2 of the filter F1.

Meanwhile, the rotational position sensor 94 detects the rotational position of the rotary dial 93. Based on this detection signal, the coefficient setter 73 reads the offset pulse number C1, optical mount correction coefficient C2, and optical filter correction coefficient C31 corresponding to filter F1 from the coefficient storage section 74. The coefficient setter 73 sets C1 as the number of drive pulses to be used in the initializing operation by the initialization controller 72, as well as C2 and C31 as the coefficients to be used in the wavelength-movement operation.

Next, the initialization controller 72 sends a series of pulses to the rotary drive mechanism 5 to drive the stepping motor and rotate the diffraction grating 2 in the direction of arrow A. As soon as it is detected by the origin sensor 6 that the rotational position of the diffraction grating 2 has reached the machine origin, the initialization controller 72 stops sending the series of pulses. Subsequently, the same controller 72 sends C1 drive pulses to the rotary drive mechanism 5, which drives the stepping motor so that the diffraction grating 2 rotates in the direction of arrow B by angle θ0, to be positioned at the wavelength origin. The operations described to this point are the same as those in the case where no optical filter 92 is inserted (see FIGS. 2A and 2B).

Figure 3:
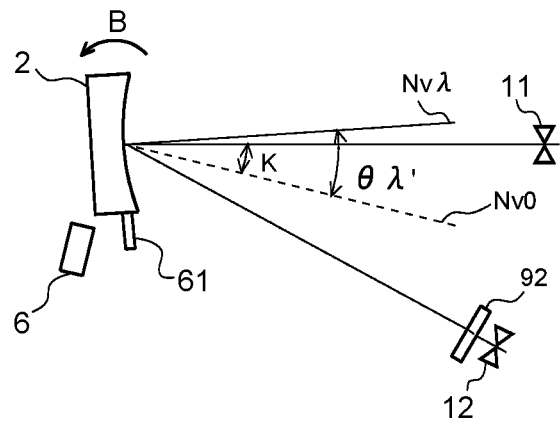
FIG. 3 is a diagram showing a diffraction grating located at a rotational position corresponding to wavelength λ, with an optical filter between the diffraction grating and the exit.

After the diffraction grating 2 has reached the wavelength origin, the wavelength-movement operation by the wavelength-movement controller 71 is performed. Specifically, the set wavelength W1, optical mount correction coefficient C2 and optical filter correction coefficient C31 are substituted into equation (2) stored in the computational expression storage section 75, to obtain the rotation angle of the diffraction grating 2 corresponding to the set wavelength W1. This rotation angle, θλ', is different from the rotation angle θλ obtained in the case where no optical filter 92 is inserted. Substituting this rotation angle θλ' into equation (1) yields the number of drive pulses P of the stepping motor. The calculated number of drive pulses P is sent to the rotary drive mechanism 5, which drives the stepping motor so that the diffraction grating 2 rotates in the direction of arrow B by angle θλ', to reach the rotational position corresponding to the set wavelength (see FIG. 3).

In this state, light is emitted from a light source. A portion of the light passes through the entrance slit 13a and the entrance 11 into the housing 1. After being reflected by the first mirror 3, the light hits the diffraction grating 2. The light which has hit the diffraction grating 2 is dispersed by the same grating 2. Among the dispersed light, the component of light having a wavelength corresponding to the rotational position of the diffraction grating 2 (i.e. the set wavelength W1) is reflected by the second mirror 4 and subsequently passes through the optical filter 92 (filter F1) before exiting from the exit 12 and the exit slit 14a.

Thus, in the present embodiment, the values of the coefficients to be used in the wavelength-movement operation are appropriately changed depending on whether or not an optical filter 92 is present in the optical path extending from the diffraction grating 2 to the exit 12. Even when an optical filter 92 is present in the optical path from the diffraction grating 2 to the exit 12, an output beam having the target wavelength λ entered by the operator can be obtained from the exit 12.

The present invention is not limited to the previously described embodiment; it can be appropriately changed or modified.

For example, in the previous embodiment, a means for detecting the rotational position of the rotary dial, i.e. the rotational position sensor 94, is provided to determine whether or not an optical filter is present in the optical path, as well as to identify the kind of optical filter if an optical filter is present, so as to automatically set necessary coefficients based on the detection results. It is also possible to allow an operator to manually set the coefficients using the input unit. The device may also be configured to receive an input of the kind of optical filter from an operator using the input unit, and set appropriate coefficients for that kind of optical filter.

In the previous embodiment, the optical filter correction coefficient is used for the calculation of the number of pulses required for rotating the diffraction grating 2 from the wavelength origin to the rotational position corresponding to the set wavelength. The optical filter correction coefficient may similarly be used for the calculation of the number of pulses required for rotating the diffraction grating 2 from the machine origin to the wavelength origin. It is also possible to use the optical filter correction coefficient for both calculations of the number of drive pulses.

Furthermore, it should be understood that the previously described embodiment and its variations are mere examples of the present invention, and any change, modification or addition appropriately made within the spirit of the present invention will naturally fall within the scope of claims of the present application.

The invention claimed is:

1. A monochromator, comprising:
   a housing with an entrance and an exit;
   a diffraction grating placed within the housing so as to receive incident light from the entrance and disperse the incident light into a spectrum of light from which a component of light having a set wavelength is to be extracted through the exit;
   an optical filter configured to be removably inserted into an optical path extending from the diffraction grating to the exit, and remove light within a specific wavelength band which is out of the set wavelength;
   a rotary drive mechanism configured to rotate the diffraction grating, using a stepping motor as a drive source;
   a wavelength-movement information setter configured to set wavelength-movement information which is a kind of information to be used for rotating the diffraction grating from a predetermined original position to a rotational position corresponding to the set wavelength; and
   a wavelength-movement controller configured to control the rotary drive mechanism so as to perform a wavelength-movement operation which includes rotating the diffraction grating to the original position and subsequently rotating the diffraction grating to the aforementioned rotational position based on the wavelength-movement information.

2. The monochromator according to claim 1, further comprising:
   a plurality of kinds of optical filters; and
   a filter insertion mechanism configured to be capable of selectively inserting one of the optical filters into the optical path extending from the diffraction grating to the exit.

3. The monochromator according to claim 2 wherein:
   a drive source of the rotary drive mechanism is a stepping motor; and
   the wavelength-movement information is a number of pulses of the stepping motor.

4. The monochromator according to claim 2, further comprising:
   a filter detector configured to detect a presence of one of the optical filters in the optical path extending from the diffraction grating to the exit, and identify a kind of optical filter in the optical path; and
   a memory which holds, for each of the plurality of kinds of optical filters, both the wavelength-movement information to be used when the optical filter is present in the optical path and the wavelength-movement information to be used when none of the optical filters is present;
   wherein:
   the wavelength-movement information setter is configured to read wavelength-movement information from the memory according to a detection result obtained with the filter detector, and set the wavelength-movement information.

5. The monochromator according to claim 1 wherein:
   a drive source of the rotary drive mechanism is a stepping motor; and
   the wavelength-movement information is a number of pulses of the stepping motor.

6. The monochromator according to claim 1, further comprising:
   a filter detector configured to detect a presence of the optical filter in the optical path extending from the diffraction grating to the exit; and
   a memory which holds both the wavelength-movement information to be used when the optical filter is present in the optical path and the wavelength-movement information to be used when no such optical filter is present,
   wherein:
   the wavelength-movement information setter is further configured to read wavelength-movement information from the memory according to a detection result obtained with the filter detector, and set the wavelength-movement information.

* * * * *